United States Patent
Delbianco et al.

(10) Patent No.: US 9,039,893 B2
(45) Date of Patent: May 26, 2015

(54) PROCESS FOR THE EXTRACTION OF HYDROCARBONS FROM OIL SANDS AND OIL SHALE

(75) Inventors: Alberto Delbianco, Robecco sul Naviglio (IT); Giambattista De Ghetto, San Donato Milanese (IT)

(73) Assignee: ENI S.p.A., Rome (IT)

( * ) Notice: Subject to any disclaimer, the term of this patent is extended or adjusted under 35 U.S.C. 154(b) by 278 days.

(21) Appl. No.: 13/378,549

(22) PCT Filed: Jun. 14, 2010

(86) PCT No.: PCT/EP2010/003775
§ 371 (c)(1),
(2), (4) Date: Mar. 5, 2012

(87) PCT Pub. No.: WO2010/145847
PCT Pub. Date: Dec. 23, 2010

(65) Prior Publication Data
US 2012/0160743 A1    Jun. 28, 2012

(30) Foreign Application Priority Data
Jun. 19, 2009 (IT) .............................. MI2009A1090

(51) Int. Cl.
| C10G 1/04 | (2006.01) |
| C10B 49/02 | (2006.01) |
| C10B 47/28 | (2006.01) |
| C10B 49/14 | (2006.01) |
| C10B 53/06 | (2006.01) |
| F24J 2/07 | (2006.01) |
| F24J 2/46 | (2006.01) |
| C10G 1/00 | (2006.01) |

(52) U.S. Cl.
CPC ................ *C10B 49/02* (2013.01); *C10B 47/28* (2013.01); *C10B 49/14* (2013.01); *C10B 53/06* (2013.01); *C10G 1/047* (2013.01); *F24J 2/07* (2013.01); *F24J 2/4649* (2013.01); *Y02E 10/41* (2013.01); *C10G 2300/80* (2013.01); *C10G 2300/805* (2013.01)

(58) Field of Classification Search
CPC .................................. C10G 1/00; C10G 1/04
USPC .................................................. 208/390, 404
See application file for complete search history.

(56) References Cited

U.S. PATENT DOCUMENTS

| 3,390,672 | A | * | 7/1968 | Snelling ..................... 126/636 |
| 4,008,758 | A |   | 2/1977 | Chubb |
| 4,108,760 | A | * | 8/1978 | Williams et al. ............ 208/390 |
| 4,357,231 | A | * | 11/1982 | Estes et al. .................. 208/404 |
| 4,382,850 | A |   | 5/1983 | Gregg |
| 4,582,590 | A |   | 4/1986 | Qader |

(Continued)

OTHER PUBLICATIONS

Fenton, D.M. et al. (1980). "The Chemistry of Shale Oil and Its Refined Products" in the Symposium on Oil Shale, Tar Sands and Related Materials, 102-109.*

(Continued)

*Primary Examiner* — Brian McCaig
(74) *Attorney, Agent, or Firm* — Oblon, McClelland, Maier & Neustadt, L.L.P.

(57) ABSTRACT

Process for the extraction of hydrocarbons contained in oil sands and oil shale comprising feeding said oil sands or oil shale to a suitable apparatus in which they are heated, directly and/or by means of a suitable vector fluid, making use of solar energy collected by means of optical concentration systems.

11 Claims, 2 Drawing Sheets

(56) References Cited

Figure 1:
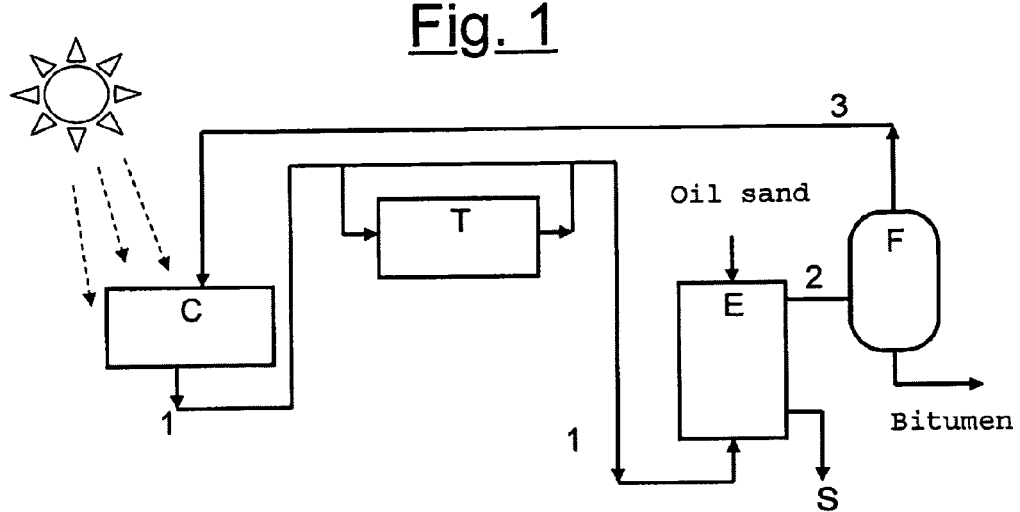

U.S. PATENT DOCUMENTS 4,588,478 A 5/1986 Warzel
5,143,598 A * 9/1992 Graham et al. ............... 208/390
2011/0277981 A1* 11/2011 Muthuramalingam
 et al. ............................ 165/200

OTHER PUBLICATIONS

International Search Report Issued Oct. 6, 2010 in PCT/EP10/003775 Filed Jun. 14, 2010.

* cited by examiner

PROCESS FOR THE EXTRACTION OF HYDROCARBONS FROM OIL SANDS AND OIL SHALE

The present invention relates to a process for the extraction of hydrocarbons contained in oil sands and oil shale, using thermal energy from a solar source.

The known art refers to extraction technologies using hot water and/or high-temperature hydrocarbon solvents, suitably heated using fossil sources (normally natural gas or petcoke).

These are "energy intensive" processes and require from 300 scf to 1300 scf of natural gas per bbl of bitumen extracted, according to the technology used (mining or in-situ thermal recovery).

Extraction with hot water requires enormous quantities of water (0.3-0.7 m$^3$ per bbl of bitumen) and also creates the problem of separation of the inorganic particles of micronic material (fine powders), which implies the use of tailing ponds that have a significant environmental impact.

We have now found a process which, by the direct use of solar energy, allows an energy saving from fossil sources (with economical and environmental advantages) and can enable the use of vector fluids causing a lower environmental impact (organic solvent, supercritical $CO_2$, etc.).

The process, object of the present invention, for the extraction of hydrocarbons contained in oil sands and oil shale, comprises feeding said oil sands or oil shale to a suitable apparatus, such as a reactor or extraction column or worm-conveyor, in which they are heated, directly and/or by means of a suitable vector fluid, making use of solar energy collected by means of optical concentration systems.

In the case of oil sands, these can be fed to an extraction column into which the vector fluid is sent in counter-current previously heated in a heating step, using solar energy collected by means of optical concentration systems, acting as hot extracting fluid, thus separating a sand, at the bottom, substantially free of the organic component, from a head stream, substantially consisting of the organic component of the sand, together with the hot extracting fluid, which is subjected to a separation step to separate the organic component from the cold extracting fluid which is recycled to the heating step.

Again in case of oil sands, as an alternative, these can be fed to the head of an extraction column to which the vector fluid is sent in equicurrent, previously heated in a heating step making use of solar energy collected by means of optical concentration systems, acting as hot extracting fluid, obtaining:

a bottom stream substantially consisting of the organic component of the sand, together with the hot extracting fluid, which is subjected to a separation step to separate the organic component from the cold extracting fluid, which is recycled to the heating step;

and sand substantially free of the organic component, subsequently discharged from the reactor.

The separation step can preferably be a flash.

The vector fluid acting as extractor fluid is preferably selected from water containing alkaline agents and/or organic fluids with a naphthene and/or aromatic base.

The water contained in the fluid or forming the fluid is preferably at a pH>7.

The extracting fluid can be used in supercritical phase and the organic separation component and extracting fluid, in this case, can be effected by modifying the temperature and pressure conditions, bringing said fluid to subcritical conditions.

In the case of oil shale, these can be fed to a pyrolysis reactor operating at temperatures higher than 350° C. so as to obtain at the head the products of the pyrolyzed gases and at the bottom the inorganic component of said oil shale.

The heating of the oil shale allows the cracking of the kerosene contained in the rock with the consequent separation of gases and hydrocarbon liquids from the inorganic component.

The heat for effecting the pyrolysis reaction can be supplied directly to the pyrolysis reactor by means of solar energy captured with optical concentration systems or it can be provided indirectly by a vector fluid at a high temperature, preferably higher than 350° C., previously heated in a heating step using solar energy collected with optical concentration systems.

The high-temperature vector fluid can be selected from molten salts, more preferably from mixtures of sodium nitrate and potassium nitrate.

In both cases, both for the sands and oil shale, the vector fluid previously heated can be accumulated in a heat tank from which it is removed when the process is effected.

There are substantially three types of optical concentration systems for capturing the solar energy:
parabolic trough
dish-engine
power tower.

In the parabolic trough system, the direct solar radiation is concentrated by means of linear parabolic reflecting systems on a straight receiving tube situated in the focus of the parabola. This energy is used for heating a thermo-vector fluid which circulates inside the receiving tube.

Dish-engine systems use parabolic disks which reflect the solar light incident on a receiver situated in the focal point. These concentrators are assembled on a structure which rotates around two axes to follow the sun.

Power tower systems operate with numerous mirrors (heliostats) capable of following the sun through suitable movement along two axes to concentrate the solar light on a single receiver positioned at the top of a tower. The heat collected by the receiver is used in a thermodynamic power cycle which in turn, in a traditional turbine-generator system, produces electricity.

Further details can be found in the publication EPRI-Solar Thermal Electric Technology: 2006—Dec. 6, 2006 (from page 2-1 to 2-10).

Three embodiments of the present invention are now described with the help of the enclosed figures which however should not be considered as limiting the scope of the invention itself.

FIG. 1 schematizes an embodiment of the process object of the present invention in the case of oil sands.

Oil sands are fed from above to an extraction column (E) and a hot extracting fluid (1) from the bottom obtaining a sand (S) substantially free of the organic component (bitumen) at the bottom, and at the top, a stream (2) substantially consisting of the organic component extracted together with the hot extracting fluid, which is subjected to a separation step by means of a flash (F) separating the organic substance, bitumen, at the bottom, and cold extracting fluid (3) at the head.

The cold extracting fluid (3) is recycled and heated in a heating step using solar energy by means of optical concentration systems (C) and accumulated in a heat tank (T) to be subsequently removed.

Figure 2:
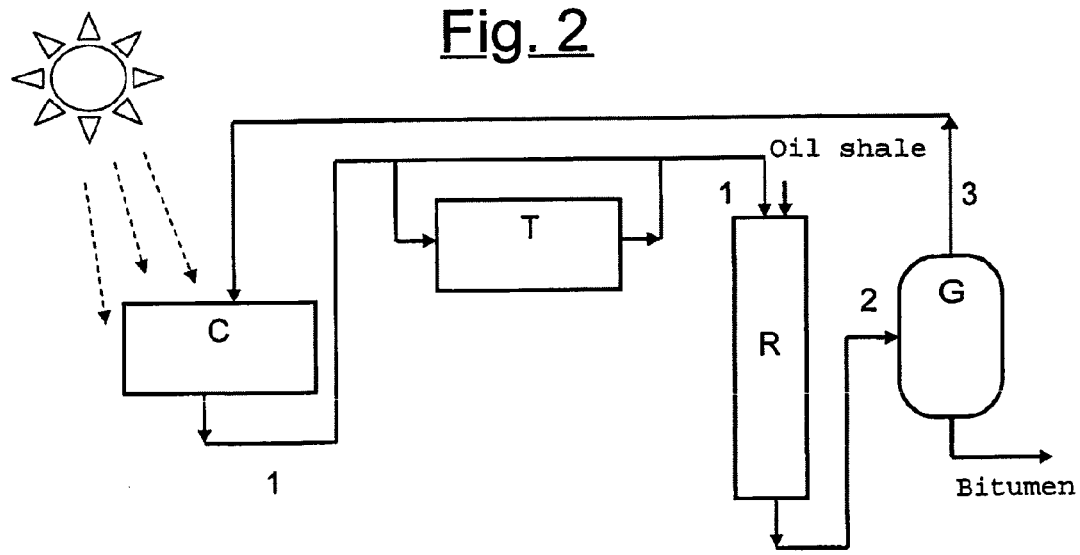

FIG. 2 schematizes another embodiment of the process, object of the present invention, in the case of oil sands.

The oil sands and subsequently the pressurized hot extracting fluid (1) are charged, in equicurrent, to the head of a fixed bed reactor (R). A stream consisting of bitumen and hot extracting fluid (2) is collected at the bottom of the reactor. The sand is subsequently discharged from the reactor. The outgoing stream (2) is sent to a separator (G) from whose head the cold fluid is extracted, which is recycled (3), heated in a heating step using solar energy by means of optical concentration systems (C) and accumulated in a heat tank (T) to be subsequently removed. The bitumen is collected at the bottom of the separator (G).

Figure 3:
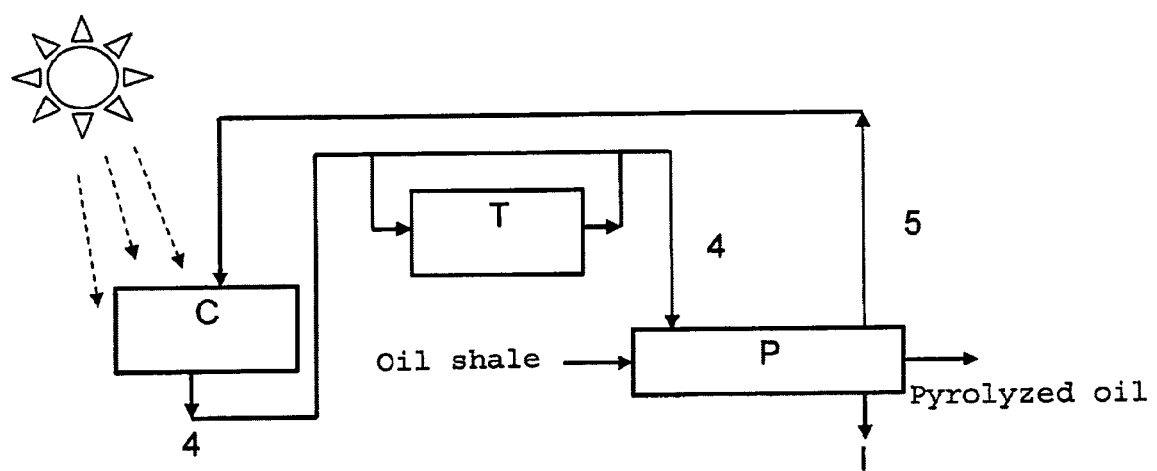

FIG. 3 schematizes an embodiment of the process, object of the present invention, in the case of oil shale.

Oil shale are fed to a pyrolysis reactor (P), operating at temperatures higher than 350° C. obtaining the pyrolized organic component of said oil shale (pyrolyzed oil) at the head and the inorganic component of the same (I) at the bottom.

The heat for the pyrolysis is supplied to the reactor by means of solar energy collected with optical concentration systems, either directly or indirectly from a high-temperature vector fluid (4) heated by means of said optical concentration systems (C) and accumulated in a heat tank (T) to be subsequently removed.

The vector fluid (5) leaving the reactor is recycled to the heating step.

The invention claimed is:

1. A process for extracting hydrocarbons contained in oil sand, the process comprising:
    feeding an oil sand into a heating apparatus; and
    heating the oil sand within the heating apparatus, wherein the heating apparatus comprises an extraction column,
    wherein energy for the heating is provided directly, indirectly through a vector fluid, or both, from solar energy collected by at least one optical concentration system to form a hot vector fluid;
    wherein the hot vector fluid acts an extracting fluid; and
    wherein said extracting fluid is in a supercritical phase and the extraction can be effected by modifying the temperature and pressure conditions to achieve subcritical conditions.

2. The process of claim 1, comprising:
    heating a vector fluid, which acts as an extracting fluid, with the solar energy to convert a cold extracting fluid into a hot extracting fluid;
    feeding the vector fluid as the hot extracting fluid into the extraction column in counter-current to the feeding of the oil sand;
    separating a product sand at the bottom of the extraction column from a product stream at the head of the extraction column, wherein the product sand is substantially free of an organic component and the product stream comprises the organic component and the hot extracting fluid; and
    separating the organic component from the extracting fluid which is recycled as the vector fluid.

3. The process of claim 2, wherein the organic component is separated from the cold extracting fluid with a flash step.

4. The process according to claim 2, wherein the vector fluid is selected from water containing alkaline agents and/or organic fluids with a naphthene and/or aromatic base.

5. The process according to claim 4, wherein the water is at a pH>7.

6. The process of claim 2, wherein the hot extracting fluid is accumulated in a heat tank from which it is collected.

7. The process of claim 1, wherein the oil sand is fed into the top of the extraction column; and further comprising:
    heating a vector fluid, which acts as an extracting fluid, with the solar energy to convert a cold extracting fluid into a hot extracting fluid;
    feeding the vector fluid as the hot extracting fluid into the extraction column in equi-current to the feeding of the oil sand;
    separating a product sand from a bottom stream, wherein the product sand is substantially free of an organic component and the bottom stream comprises the organic component and the hot extracting fluid;
    discharging the product sand from the heating apparatus; and
    separating the organic component from the extracting fluid which is recycled as the vector fluid.

8. The process of claim 7, wherein the organic component is separated from the cold extracting fluid with a flash step.

9. The process of claim 7, wherein the hot extracting fluid is accumulated in a heat tank from which it is collected.

10. The process according to claim 7, wherein the vector fluid is selected from water containing alkaline agents and/or organic fluids with a naphthene and/or aromatic base.

11. The process of claim 1, wherein the energy for heating is provided indirectly through a vector fluid which is accumulated in a heat tank from which it is collected.

* * * * *